Figures 1, 2:
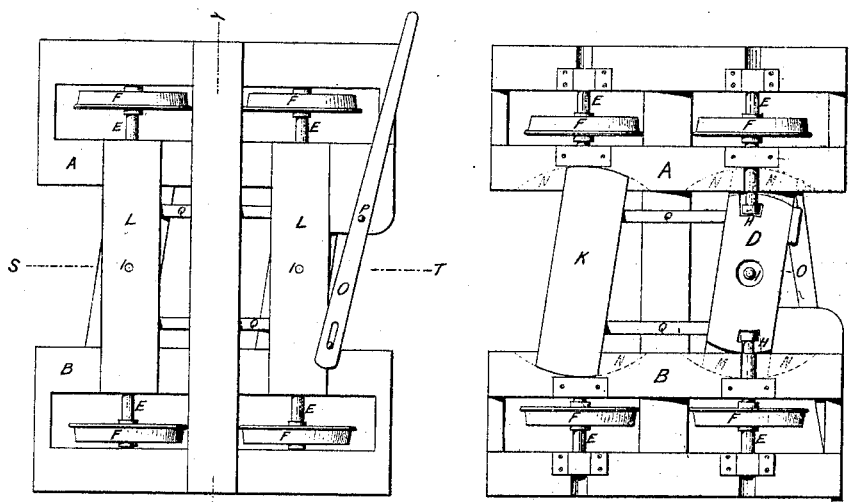
Figure 3:
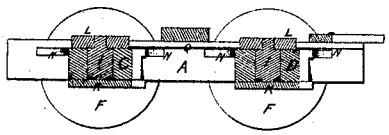
Figure 4:
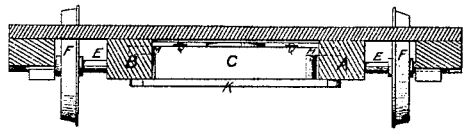

E. HIPKINS.
Car Truck.

No. 111,934.             Patented Feb. 21, 1871.

"Inventor."
Edward Hipkins
by Messrs Ridout & Howard
his attorneys in fact

John Wheeler Elliot
C. J. Cayley
"Witnesses."

United States Patent Office.

EDWARD HIPKINS, OF BURFORD TOWNSHIP, CANADA.

Letters Patent No. 111,934, dated February 21, 1871.

IMPROVEMENT IN CAR-TRUCKS.

The Schedule referred to in these Letters Patent and making part of the same.

I, EDWARD HIPKINS, of the township of Burford, in the county of Brant, in the province of Ontario and Dominion of Canada, have invented certain Improvements in Trucks for Carrying Rail-Cars, of which the following is a specification.

Nature and Objects of the Invention.

The object of my invention is to attach the axles of the wheels to the truck in such a manner that the gauge of the wheels can be altered, when necessary, by simply running the car upon a graduated track, which acts as a switch for connecting the two gauges.

The axles are made fast to the wheels, but slide backward and forward in journals.

My invention consists in suitable contrivances, hereinafter more fully described, by which the wheels and axles may be locked to any gauge upon which the car is about to run.

Description of the Accompanying Drawing.

Figure I, plan of truck set for broad gauge.

Figure II, plan of under side set for narrow gauge, showing how the axles fit into the receptacles.

Figure III, section through S T.

Figure IV, section through X Y.

General Description.

I do not confine myself to any particular design of truck, nor to the material used, as my contrivance may be adapted to any form of truck.

Between the beams A and B of the truck are two rotating tables, C and D, which are used to keep the axles E within the required position.

When the wheels F are on the broad gauge the tables C and D keep them set by pressing against the axles G; but when on the narrow gauge the axles E, which are made with collars, enter the receptacle H, as shown in drawing.

The front of the receptacles H are made in such a manner that the axles E have just room to enter, and on the tables C and D being slightly turned the axles E are kept in their position by their collars fitting into grooves in the receptacle H.

The rotating tables C and D are held by the center pins, I, which sit on the bottom plates K, and pass through the upper pieces L on the upper side of the tables C and D.

The tables are made, as shown in drawing, with flanges, M, which flanges fit and slide in the grooves N, made in the truck timbers A and B.

The rotating tables C and D are moved by the lever O attached to the frame at the fulcrum P, the tables being connected to each other by the rods Q.

The bottom plates K are made with flanges, which form a cover for axle-boxes.

The axles being short are consequently stronger, and give more freedom to the wheels when the car is curving, and accidents caused by an axle breaking are next to impossible, for if a wheel should break the truck will still run on three.

As, by my arrangement, each wheel has a separate axle, a broken wheel can be replaced without disturbing the others, therefore the change can be accomplished in a much shorter time than when the present truck is used.

Instead of having the plates K to cover the axle-box a small lid can be screwed on, or any other simple means, to close the passage, as there will be no pressure on the said lid, it, the lid, being simply requisite to keep dirt from clogging the axles.

Claims.

I claim—

1. The combination of the lever O and rotating tables C and D, connected together by rods Q, and working on the center pins I, substantially as set forth.

2. The rotating tables C and D, with receptacles H, in combination with the axles E, formed with collars to enter said receptacles, as and for the purpose described.

EDWARD HIPKINS.

Witnesses:
ROBERT HARBOTTLE, M. B.;
HENRY HIPKINS.